(12) United States Patent
Oman

(10) Patent No.: US 11,917,094 B2
(45) Date of Patent: Feb. 27, 2024

(54) AUTOMATIC CONTROL OF SMARTPHONE DRIVER MODE USING ULTRA-WIDEBAND COMMUNICATION

(71) Applicant: APTIV TECHNOLOGIES LIMITED, St. Michael (BB)

(72) Inventor: Todd P. Oman, Greentown, IN (US)

(73) Assignee: APTIV TECHNOLOGIES LIMITED, St. Michael (BB)

(*) Notice: Subject to any disclaimer, the term of this patent is extended or adjusted under 35 U.S.C. 154(b) by 177 days.

(21) Appl. No.: 17/163,765

(22) Filed: Feb. 1, 2021

(65) Prior Publication Data
US 2022/0247854 A1 Aug. 4, 2022

(51) Int. Cl.
| | | |
|---|---|---|
| H04W 4/80 | (2018.01) | |
| H04M 1/60 | (2006.01) | |
| H04M 1/72463 | (2021.01) | |
| H04M 1/72454 | (2021.01) | |
| H04M 1/72457 | (2021.01) | |
| B60K 35/00 | (2006.01) | |

(52) U.S. Cl.
CPC ........... *H04M 1/6091* (2013.01); *B60K 35/00* (2013.01); *H04M 1/72454* (2021.01); *H04M 1/72457* (2021.01); *H04M 1/72463* (2021.01); *H04W 4/80* (2018.02); *B60K 2370/1438* (2019.05); *B60K 2370/164* (2019.05); *B60K 2370/563* (2019.05); *B60K 2370/589* (2019.05)

(58) Field of Classification Search
CPC .......... H04M 1/6091; H04M 1/72463; H04M 1/72457; H04M 1/72454; H04W 4/80; B60K 35/00; B60K 2370/589; B60K 2370/164; B60K 2370/1438; B60K 2370/563

USPC ...................................................... 455/569.2
See application file for complete search history.

(56) References Cited

U.S. PATENT DOCUMENTS

| | | | |
|---|---|---|---|
| 8,930,045 B2* | 1/2015 | Oman | G07C 9/00309 |
| | | | 340/426.36 |
| 9,533,576 B2* | 1/2017 | Kalbus | G01C 21/34 |
| 9,820,215 B2* | 11/2017 | Tzannes | H04M 1/72436 |
| 9,979,814 B2* | 5/2018 | Xuan | H04W 4/027 |
| 10,044,853 B2* | 8/2018 | Yoganathan | H04W 4/40 |
| 10,153,938 B2* | 12/2018 | Xuan | H04M 1/72463 |

(Continued)

OTHER PUBLICATIONS

NXP—Design with US, "Ultra-Wideband (UWB) Ranging and Sensing Technology Explained—YouTube," dated Jun. 13, 2019, https://www.youtube.com/watch?v=6Y8rgUD7DL4&ab_channel= NXP-Designwithus, downloaded Jan. 19, 2021, 2 pages.

(Continued)

*Primary Examiner* — April G Gonzales
(74) *Attorney, Agent, or Firm* — Miller Johnson

(57) ABSTRACT

Computer-implemented methods include detecting a device ultra-wideband (UWB) transceiver of a mobile device and a set of vehicle UWB transceivers of a vehicle, determining a defined driver zone within the vehicle, the defined driver zone indicating a set of relative positions within the vehicle, communicating between the device UWB transceiver and the set of vehicle UWB transceivers to determine a position of the mobile device within the vehicle, and automatically enabling a driver mode of the mobile device whereby operation of the mobile device is limited when the determined position of the mobile device is within the defined driver zone and the vehicle is moving.

20 Claims, 4 Drawing Sheets

(56) References Cited

U.S. PATENT DOCUMENTS

| | | | | |
|---|---|---|---|---|
| 10,230,834 | B2* | 3/2019 | Bachmann | H04W 4/027 |
| 10,410,450 | B1* | 9/2019 | DeLong | B60C 23/0413 |
| 10,486,646 | B2* | 11/2019 | Ledvina | H04W 4/80 |
| 10,863,019 | B2* | 12/2020 | Pandurangarao | H04W 76/14 |
| 11,212,642 | B2* | 12/2021 | Ledvina | G07C 9/29 |
| 2013/0217331 | A1* | 8/2013 | Manente | H04W 4/80 |
| | | | | 455/41.2 |
| 2019/0225080 | A1* | 7/2019 | Mueller | B60W 30/146 |
| 2022/0257615 | A1* | 8/2022 | Scangarella-Oman | |
| | | | | A61K 31/4985 |

OTHER PUBLICATIONS

NXP Semiconductors, "Ultra-Wideband (UWB) Smart Car Access Explained by Continental and NXP—YouTube," dated Jan. 8, 2020, https://www.youtube.com/watch?v=NFThn66G7BQ&ab_channel=NXPSemiconductors, downloaded Jan. 19, 2021, 4 pages.

NXP Semiconductors, "VW with NXP Show the Power of UWB for Future Cars—YouTube," dated Oct. 1, 2019, https://www.youtube.com/watch?v=9XiPCJEIEKo, downloaded Jan. 19, 2021, 2 pages.

NXP Semiconductors, "Welcome to NXP Connects 2020—Opening Keynote—YouTube," dated Oct. 20, 2020, https://www.youtube.com/watch?v=9KO9ppgydrg&ab_channel=NXPSemiconductors ½, downloaded Jan. 19, 2021, 2 pages.

NXP Semiconductors, "You are UWB—Discover Ultra-Wideband Use Cases with NXP—YouTube," dated Dec. 18, 2019, https://www.youtube.com/watch?v=sYLI3CTmYAE&ab_channel=NXPSemiconductors, downloaded Jan. 19, 2021, 2 pages.

\* cited by examiner

AUTOMATIC CONTROL OF SMARTPHONE DRIVER MODE USING ULTRA-WIDEBAND COMMUNICATION

FIELD

The present application generally relates to ultra-wideband (UWB) communication and, more particularly, to automatic control of a mobile device or smartphone driver mode using UWB communication.

BACKGROUND

Driver distraction is a major issue that can lead to vehicle accidents and in some cases death. In today's vehicles, one major source of driver distraction is mobile devices (e.g., mobile phones). Many of today's mobile devices therefore have a driver mode, whereby functionality of the mobile device is limited. For example, when enabled, a user may be unable to control some functionality of the mobile device. Vehicles often provide mobile device features through the vehicle's infotainment unit. This allows for a driver of the vehicle to more safely utilize the functionality of the mobile device while being able to maintain better focus on the vehicle's surroundings. This typically involves connecting the mobile device to the vehicle's infotainment system via a wired or wireless connection (e.g., Bluetooth). Examples of such mobile device features include phone calls, music playing/streaming, and navigation. Enablement of the driver mode can be done either manually or automatically. Manual enablement is susceptible to driver error (e.g., forgetting to enable driver mode during every trip). Automatic enablement is often incapable of discerning between driver and passenger mobile devices, and thus typically allows for easy disablement. Thus, while these conventional techniques do work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a computer-implemented method is presented. In one exemplary implementation, the computer-implemented method comprises detecting, by a mobile device comprising a device ultra-wideband (UWB) transceiver, a set of vehicle UWB transceivers of a vehicle, determining, by the mobile device, a defined driver zone within the vehicle, the defined driver zone indicating a set of relative positions within the vehicle, communicating, by the mobile device via the device UWB transceiver, with the set of vehicle UWB transceivers to determine a position of the mobile device within the vehicle, and enabling, by the mobile device, a driver mode whereby operation of the mobile device is limited when the determined position of the mobile device is within the defined driver zone and the vehicle is moving.

In some implementations, the driver mode limits display and touch inputs via the mobile device and instead outputs display and receives touch inputs via an infotainment unit of the vehicle. In some implementations, at least one of a center position, a shape, and a size of the defined driver zone is user-customizable. In some implementations, the set of vehicle UWB transceivers is one vehicle UWB transceiver center approximately at a center of a driver seat of the vehicle, and wherein the defined driver zone has a circular shape.

In some implementations, the set of vehicle UWB transceivers is three or more UWB transceivers. In some implementations, the defined driver zone has a square or rectangular shape. In some implementations, the set of vehicle UWB transceivers is three UWB transceivers arranged in a triangular configuration. In some implementations, the set of vehicle UWB transceivers is four UWB transceivers arranged in a diamond configuration. In some implementations, the set of vehicle UWB transceivers is four UWB transceivers arranged proximate to four corners of the vehicle.

According to another aspect of the present disclosure, another computer-implemented method is presented. In one exemplary implementation, the computer-implemented method comprises detecting, by a controller of a vehicle having a set of UWB transceivers, a mobile device comprising a device UWB transceiver, determining, by the controller, a defined driver zone within the vehicle, the defined driver zone indicating a set of relative positions within the vehicle, communicating, by the controller via the set of vehicle UWB transceivers, with the device UWB transceiver to determine a position of the mobile device within the vehicle, and commanding, by the controller, the mobile device to enable a driver mode whereby operation of the mobile device is limited when the determined position of the mobile device is within the defined driver zone and the vehicle is moving.

In some implementations, the driver mode limits display and touch inputs via the mobile device and instead outputs display and receives touch inputs via an infotainment unit of the vehicle. In some implementations, at least one of a center position, a shape, and size of the defined driver zone is user-customizable. In some implementations, the set of vehicle UWB transceivers is one vehicle UWB transceiver center approximately at a center of a driver seat of the vehicle, and wherein the defined driver zone has a circular shape.

In some implementations, the set of vehicle UWB transceivers is three or more UWB transceivers. In some implementations, the defined driver zone has a square or rectangular shape. In some implementations, the set of vehicle UWB transceivers is three UWB transceivers arranged in a triangular configuration. In some implementations, the set of vehicle UWB transceivers is four UWB transceivers arranged in a diamond configuration. In some implementations, the set of vehicle UWB transceivers is four UWB transceivers arranged proximate to four corners of the vehicle.

According to another aspect of the present disclosure, a system comprising a non-transitory computer-readable medium configured to store a set of instructions and one or more processors configured to execute the set of instructions is presented. In one exemplary implementation, the execution of the set of instructions by the one or more processors causes the one or more processors to perform operations comprising detecting, via a device UWB transceiver of a mobile device, a set of vehicle UWB transceivers of a vehicle, determining a defined driver zone within the vehicle, the defined driver zone indicating a set of relative positions within the vehicle, communicating, by the device UWB transceiver, with the set of vehicle UWB transceivers to determine a position of the mobile device within the vehicle, and enabling a driver mode of the mobile device whereby operation of the mobile device is limited when the determined position of the mobile device is within the defined driver zone and the vehicle is moving.

In some implementations, the driver mode limits display and touch inputs via the mobile device and instead outputs display and receives touch inputs via an infotainment unit of the vehicle.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, driver distraction due to mobile devices is a major issue. For this reason, many of today's mobile devices have a driver mode, whereby functionality of the mobile device is limited. Enablement of the driver mode can be done either manually or automatically. Manual enablement is susceptible to driver error (e.g., forgetting to enable driver mode during every trip). Automatic enablement is often incapable of discerning between driver and passenger mobile devices, and thus typically allows for easy disablement. Accordingly, improved systems and methods for automatic control of a smartphone driver mode are presented. These systems and methods utilize ultra-wideband (UWB) communication to precisely detect the relative location of mobile device(s) within a vehicle. When the mobile device is determined to be within a defined driver zone indicating an area or a set of relative positions in the vehicle 100 where a driver would be expected to have his/her mobile device, the driver mode of the mobile device 200 can be automatically enabled. In some implementations, this automatic enablement only occurs when the vehicle 100 is also determined to be moving (e.g., a speed greater than a threshold). In other words, the driver mode could be temporarily disabled or not enabled when the vehicle 100 is stopped (e.g., at a traffic light) and thus the driver's interaction with the mobile device 200 itself presents less of an issue.

Figure 1:
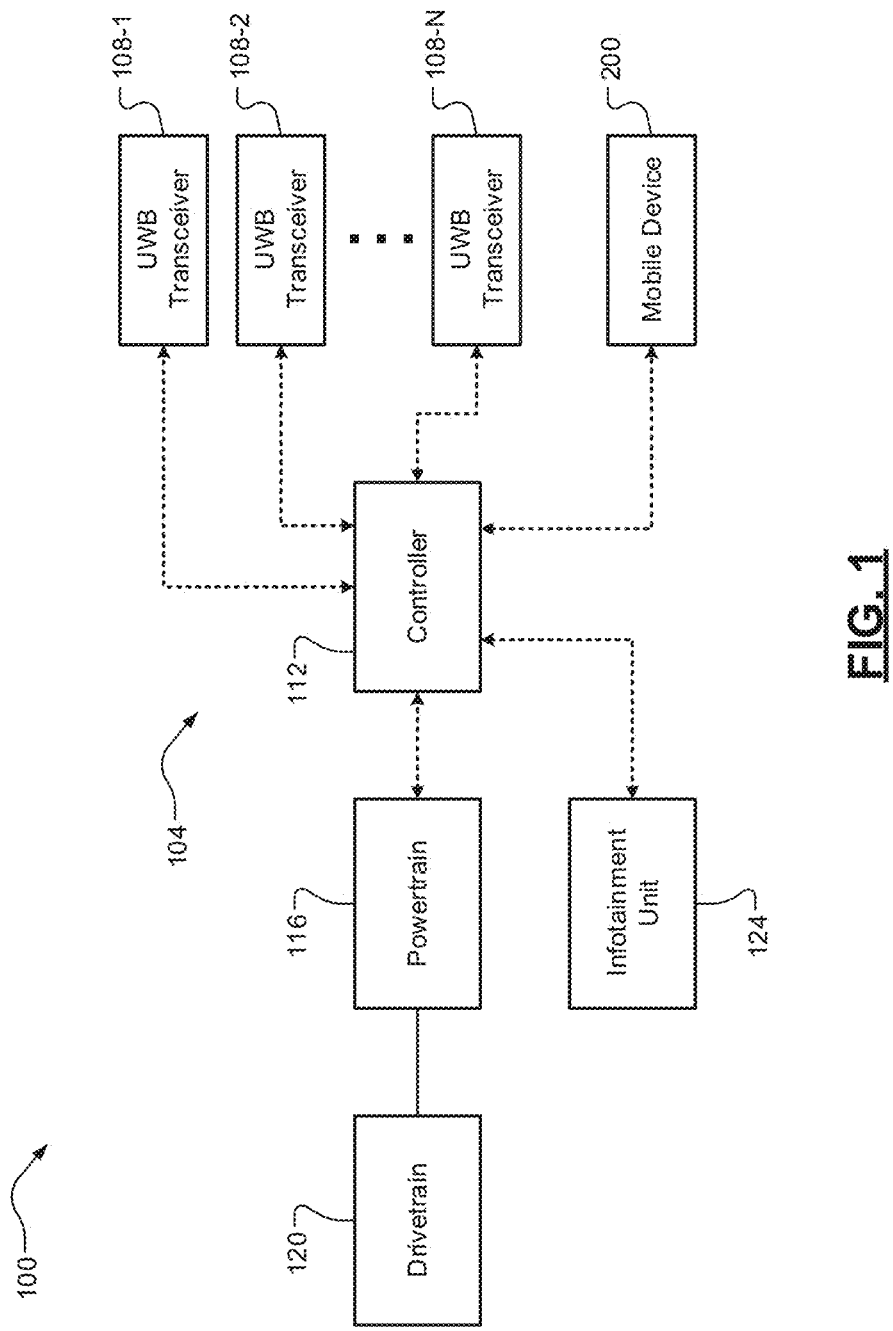
FIG. 1 is a functional block diagram of an example vehicle communication system comprising a set of at least three ultra-wideband (UWB) transceivers according to some implementations of the present disclosure.

Referring now to FIG. 1, a functional block diagram of a vehicle 100 having an example communication system 104 comprising a set of at least three UWB transceivers 108-1 . . . 108-N (N≥3; collectively, "UWB transceivers 108") according to some implementations of the present disclosure is illustrated. Each UWB transceiver 108 is configured for low-energy, short-range, high-bandwidth radio communication and the UWB transceivers 108 collectively provide for very precise location accuracy (e.g., within ~10 centimeters) via time-of flight (ToF) or time-difference-of-arrival (TDoA) positioning techniques. A controller 112 is in communication with the UWB transceivers 108 and other typical vehicle components, such as a powertrain 120 for generating and transferring drive torque to a driveline 124 of the vehicle 100 for propulsion and an infotainment unit 124 for displaying information to and receiving input (e.g., touch input) from a driver or other passenger(s) of the vehicle. The controller 112 is also in communication with one or more mobile devices 200 (e.g., mobile phones). The controller 112 is configured to implement at least a portion of the techniques of the present disclosure, which will now be described in greater detail.

Figure 2:
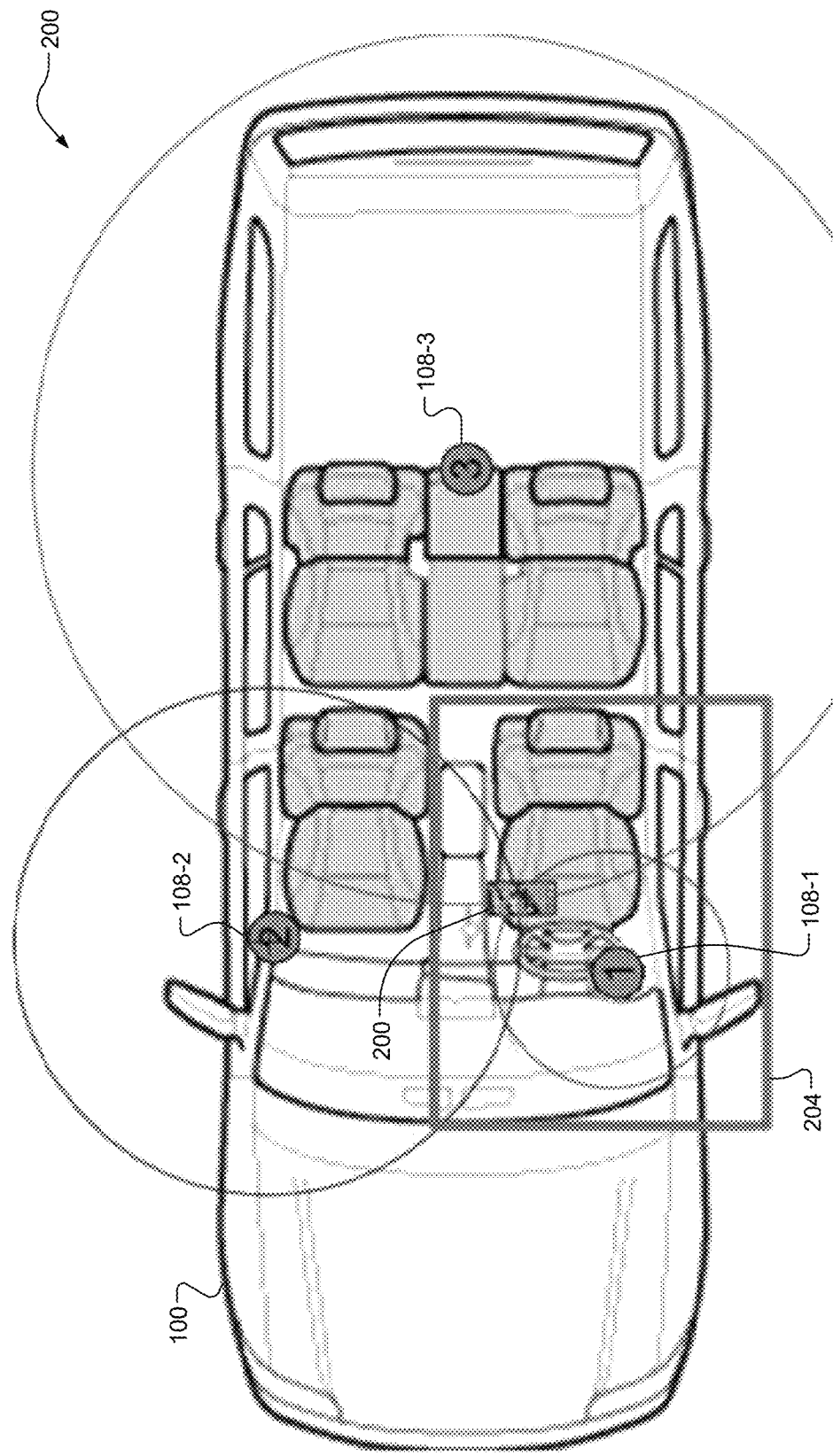
FIG. 2 is an overhead view of an example triangular vehicle UWB transceiver configuration and a defined driver zone for automatic control for mobile device driver mode using UWB communication according to some implementations of the present disclosure.

Referring now to FIG. 2, an overhead view 200 of the vehicle 100 illustrating an example triangular vehicle UWB transceiver configuration and a defined driver zone for automatic control for mobile device driver mode using UWB communication according to some implementations of the present disclosure is illustrated. In the illustrated example, there are three UWB transceivers 108-1 . . . 108-3 arranged in a triangular-type configuration. It will be appreciated that this is merely an example configuration and that any suitable combination of three or more UWB transceivers 108 arranged to provide triangulation-like positioning could be utilized. As shown in FIG. 2, a mobile device 200 is within the vehicle 100 proximate to a driver seat of the vehicle. When the mobile device 200 nears the vehicle 100 and is configured for UWB communication (e.g., via its own UWB transceiver), the controller 116 is configured to detect its presence by communicating with the UWB transceivers 108 or vice-versa (i.e., software at the mobile device 200). In some cases, the controller 116 may also be configured to determine whether or not the mobile device 200 is an authorized mobile device. The term "authorized" as used herein refers to the mobile device 200 being associated with an authorized user of the vehicle 100 (e.g., an owner of the vehicle 100) that establishes the mobile device 200 as an authorized electronic key. This could be determined by detecting a key fob on the user that is also in possession of the mobile device 200 or in any other suitable manner, such as the mobile device 200 being logged into an authorized account or service associated with the vehicle 100.

This initial communication between the mobile device 200 and the controller 116 of the vehicle 100 to initially detect and verify authentication of the mobile device 200 could be performed via non-UWB communication mediums. For example, short-range wireless communication mediums such as Bluetooth or WiFi (e.g., WiFi Direct) could be utilized. This could include, for example, the controller 116 polling for a nearby mobile device in order to "wakeup" the vehicle 100, authenticating the mobile device 200 as an authorized electronic key, as well as other approach functions (e.g., activate welcome lights on the vehicle 100). Other longer-range communication mediums could also be utilized for part of this process. For example, a global positioning satellite (GPS) system could be utilized by the controller 116, provided that a sufficient GPS signal is available (e.g., not in a parking garage or similar structure) to determine when the mobile device 200 and the vehicle 100 are within a threshold distance from each other such that the wakeup/authentication procedure through the other communication medium(s) as described above could then be performed. This initial communication could also include the establishment of a wireless connection between the mobile device 200 and the controller 116 of the vehicle 100 as part of a driver mode whereby operation of the mobile device 200 is limited, such as, for example, by limiting display and touch inputs via the mobile device 200 and instead outputs display and receives touch inputs via the infotainment unit 124 of the vehicle 100.

As shown, the three vehicle UWB transceivers 108-1, 108-2, and 108-3 are arranged in a triangular-type configuration where two vehicle UWB transceivers 108-1, 108-2 are arranged at front corners of a cabin of the vehicle 100 and a third vehicle UWB transceiver 108-3 is arranged at a central rear point of the cabin of the vehicle 100. The circular regions relative to each vehicle UWB transceiver 200 represent ToF measurements from that particular vehicle UWB transceiver 108 to the device UWB transceiver of the mobile device 200 or vice-versa. The intersections of these represents the precise position of the mobile device 200 relative to the vehicle 100 (i.e., within the cabin of the vehicle 100). It will be appreciated that the quantity and triangular-type configuration of the vehicle UWB transceivers 108 is merely one example and other suitable quantities and/or arrangements of the vehicle UWB transceivers 108 could be implemented. For example only, the vehicle UWB transceivers 108 could include four UWB transceivers arranged in a diamond configuration (e.g., two at front/rear central points of the cabin of the vehicle 100 and two at central outer points of the cabin of the vehicle 100) or proximate to four corners of the vehicle 100. Provided that at least three vehicle UWB transceivers 108 are implemented, precise position detection of the mobile device 200 relative to the vehicle 100 can occur. However, a single vehicle UWB transceiver 108 configuration is also described below.

As shown, there is a defined driver zone 204 that defines an area relative to the vehicle 100 that, if the mobile device 200 is detected to be within, causes the mobile device to enable the driver mode (e.g., sometimes also only when the vehicle 100 is also determined to be moving). While a circular-shaped defined driver zone 204 centered approximately at a center of a driver seat of the vehicle 100 is shown, it will be appreciated that any suitable center position, shape (square, rectangular, etc.), and/or size for the defined driver zone could be utilized. In some implementations, the defined driver zone could be a predefined driver zone specified by a manufacturer of the vehicle 100. There could also be a set of defined driver zones that the driver could select from, or the defined driver zone shape and/or size could be user-customizable (e.g., via a website, via an application on the mobile device 200, or via the infotainment unit 124 of the vehicle 100). In one alternate configuration, the vehicle 100 could only comprise or utilize a single vehicle UWB transceiver 108 provided it is centered approximately at the center of the driver seat of the vehicle 100 and the defined driver zone would have a circular shape relative to the center point where the single vehicle UWB transceiver 108 is arranged. This configuration, while potentially less expensive and/or complex to implement, is less flexible with respect to the shaping of the defined driver zone. In other words, this circular defined driver zone may extend into other areas of the vehicle 100 where other passengers mobile devices could be (across the center armrest, behind the driver seat, etc.).

Figure 3A:
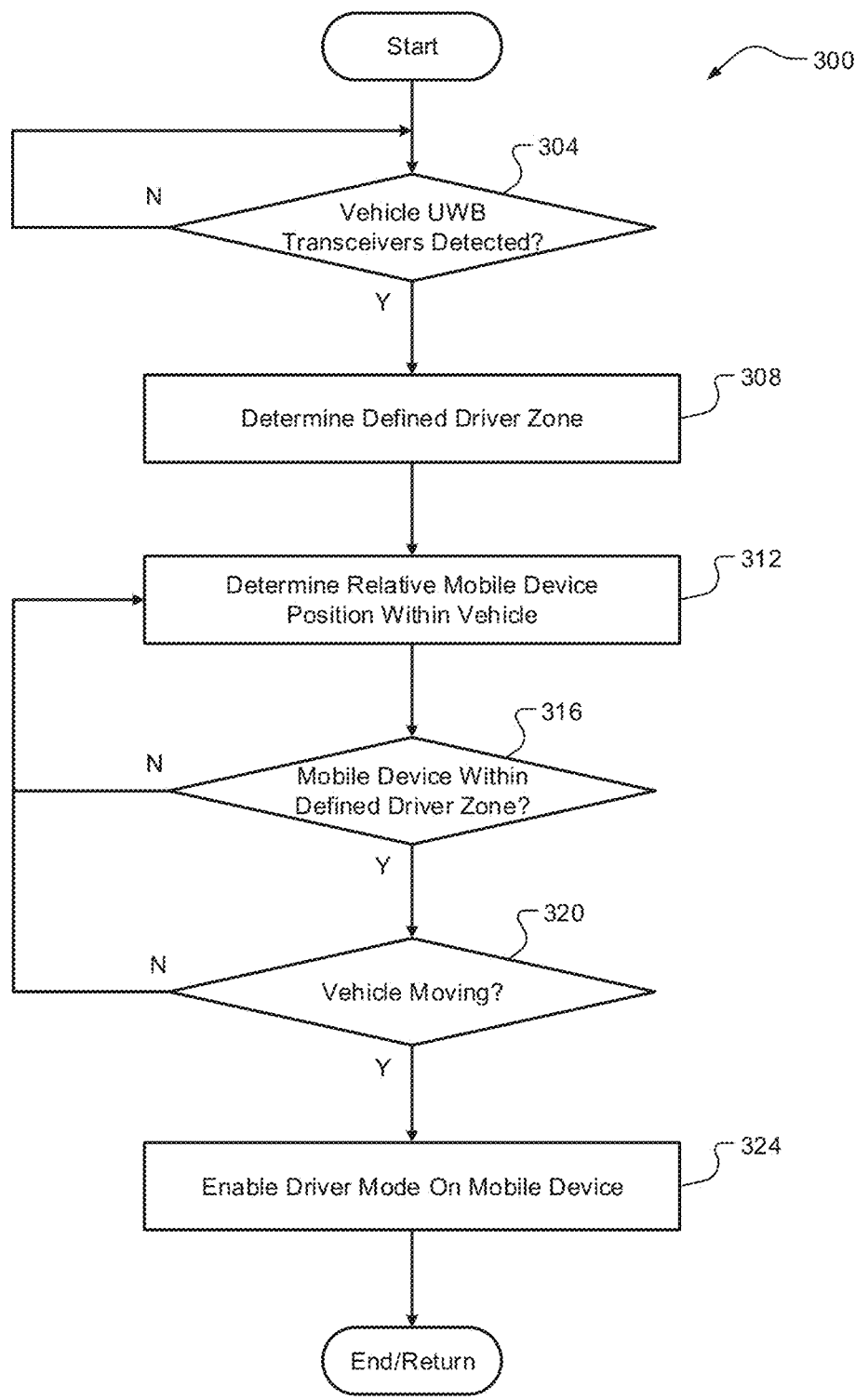
FIGS. 3A-3B are flow diagrams of example automatic control methods for mobile device driver mode using UWB communication according to some implementations of the present disclosure.

Referring now to FIG. 3A, a flow diagram of an example automatic control method 300 for mobile device driver mode using UWB communication according to some implementations of the present disclosure is illustrated. While this method 300 is described with reference to the components of FIGS. 1-2, it will be appreciated that the method 300 could be applicable to any suitable vehicles and mobile devices. At 304, the mobile device 200 detects for a set of vehicle UWB transceivers 108 of the vehicle 100. When detected, the method 300 proceeds to 308. Otherwise, the method 300 ends or returns to 304. At 308, the mobile device 200, via its device UWB transceiver, determines the defined driver zone within the vehicle 100, the defined driver zone indicating a set of relative positions within the vehicle 100. At 312, the mobile device 200 communicates via the device UWB transceiver with the set of vehicle UWB transceivers 108 to determine a position of the mobile device 200 within the vehicle 100. At 316, the mobile device 200 determines whether it is in the defined driver zone. When false, the method 300 ends or returns to 312 for continued position monitoring. When true, the method 300 proceeds to optional 320 where it is further determined whether the vehicle 100 is currently moving. As previously discussed, the driver mode of the mobile device 200 could in some cases only be automatically enabled when the vehicle 100 is also moving and not more safely stopped. When false, the method 300 ends or returns to 312 for continued position and vehicle movement monitoring. When true, the method 300 proceeds to 324 where the mobile device 200 automatically enables the driver mode whereby operation of the mobile device 200 is limited (e.g., and potentially provided, at least in part, via the infotainment unit 124 of the vehicle 100). The method 300 then ends, returns to 312 for continued position and vehicle movement monitoring (e.g., for possible subsequent automatic disablement of the driver mode), or returns to 304 (e.g., for a new key cycle).

Figure 3B:
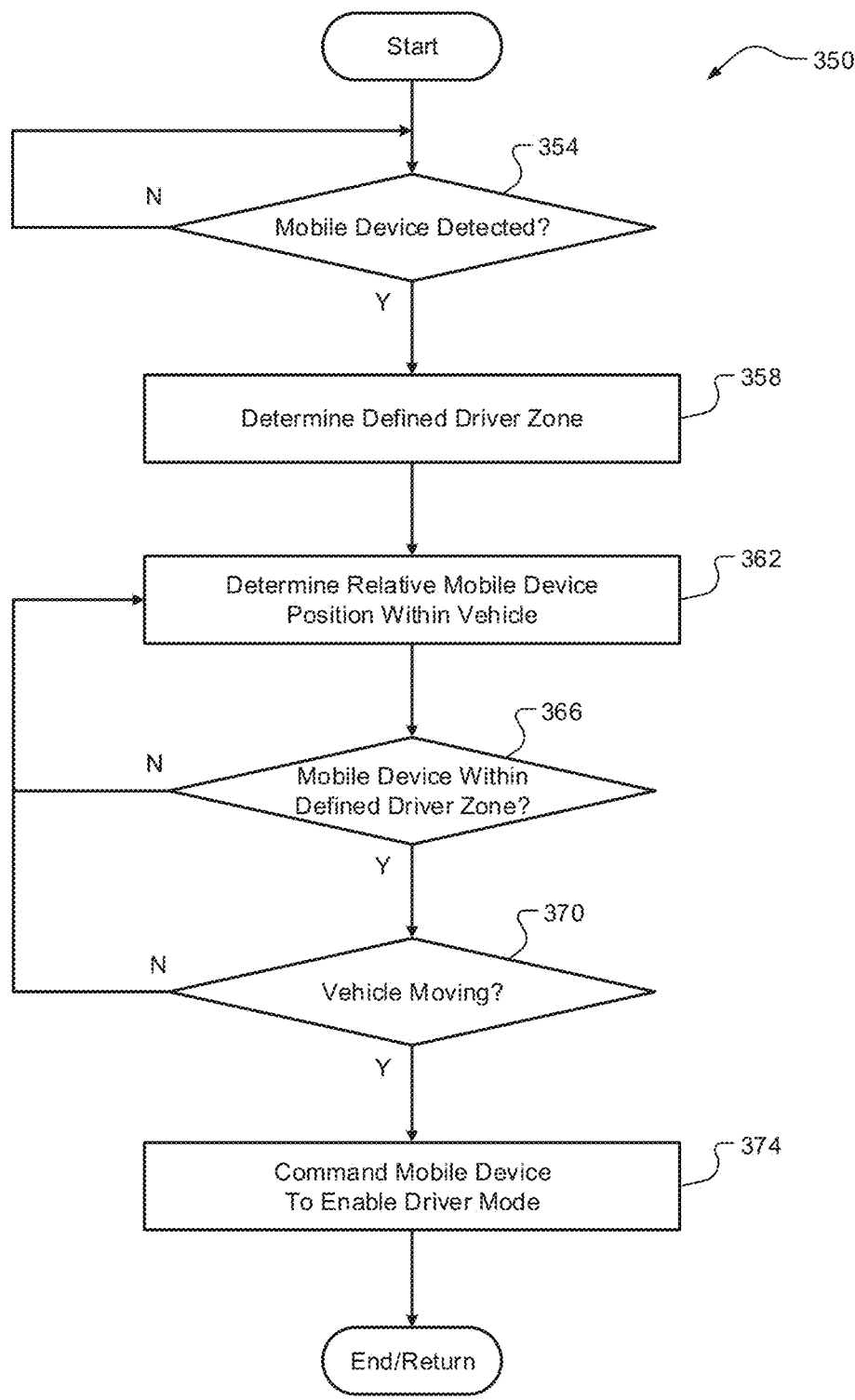

Referring now to FIG. 3B, a flow diagram of another example automatic control method 350 for mobile device driver mode using UWB communication according to some implementations of the present disclosure is illustrated. While this method 350 is also described with reference to the components of FIGS. 1-2, it will be appreciated that the method 300 could be applicable to any suitable vehicles and mobile devices. At 354, the controller 112, via the set of vehicle UWB transceivers 108 of the vehicle 100, detects for the mobile device 200 and its device UWB transceiver. When detected, the method 350 proceeds to 358. Otherwise, the method 350 ends or returns to 354. At 358, the controller 112 determines the defined driver zone within the vehicle 100, the defined driver zone indicating a set of relative positions within the vehicle 100. At 362, the controller 112 communicates via the set of vehicle UWB transceivers 108 with the device UWB transceiver of the mobile device 200 to determine a position of the mobile device 200 within the vehicle 100. At 366, the controller 116 determines whether the mobile device 200 is in the defined driver zone. When false, the method 350 ends or returns to 362 for continued position monitoring. When true, the method 350 proceeds to optional 370 where it is further determined whether the vehicle 100 is currently moving. As previously discussed, the driver mode of the mobile device 200 could in some cases only be automatically enabled when the vehicle 100 is also moving and not more safely stopped. When false, the method 350 ends or returns to 362 for continued position and vehicle movement monitoring. When true, the method 300 proceeds to 374 where the controller 116 commands or otherwise instructs the mobile device 200 to automatically enable the driver mode whereby operation of the mobile device 200 is limited (e.g., and potentially provided, at least in part, via the infotainment unit 124 of the vehicle 100). The method 350 then ends, returns to 362 for continued position and vehicle movement monitoring (e.g., for possible subsequent automatic commanding or instructions for disablement of the driver mode at the mobile device 200), or returns to 354 (e.g., for a new key cycle).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   detecting, by a mobile device including a device ultra-wideband (UWB) transceiver, a set of vehicle UWB transceivers of a vehicle;
   determining, by the mobile device, a defined driver zone within the vehicle, the defined driver zone indicating a set of boundary positions within the vehicle relative to a driver seat within the vehicle;
   communicating, by the mobile device via the device UWB transceiver, with the set of vehicle UWB transceivers to determine a position of the mobile device within the vehicle;
   detecting, by a controller of the vehicle, that a human operator is sitting in the driver seat of the vehicle and that the human operator has started and begun driving the vehicle, wherein the controller is configured to communicate with the mobile device;
   enabling, by the mobile device, a driver mode whereby operation of the mobile device is limited when (i) the determined position of the mobile device is within the defined driver zone and (ii) the controller detects that the human operator is sitting in the driver seat of the vehicle and has started and begun driving the vehicle;
   detecting, by the controller, a subsequent stop of the vehicle; and
   automatically disabling, by the mobile device, the driver mode in response to the controller detecting the subsequent stop of the vehicle.

2. The computer-implemented method of claim 1, wherein:
   the driver mode limits a set of functions of the mobile device;
   the set of functions includes display and receiving touch inputs; and
   the set of functions are carried out via an infotainment unit of the vehicle in response to the mobile device being in the driver mode.

3. The computer-implemented method of claim 1, wherein at least one of a center position, a shape, and a size of the defined driver zone is user-customizable.

4. The computer-implemented method of claim 1, wherein:
   the set of vehicle UWB transceivers includes one vehicle UWB transceiver located approximately at a center of the driver seat of the vehicle; and
   the defined driver zone has a circular shape.

5. The computer-implemented method of claim 1, wherein the set of vehicle UWB transceivers includes at least three UWB transceivers.

6. The computer-implemented method of claim 5, wherein the defined driver zone has a square or rectangular shape.

7. The computer-implemented method of claim 5, wherein the set of vehicle UWB transceivers includes three UWB transceivers arranged in a triangular configuration.

8. The computer-implemented method of claim 5, wherein the set of vehicle UWB transceivers includes four UWB transceivers arranged in a diamond configuration.

9. The computer-implemented method of claim 5, wherein the set of vehicle UWB transceivers includes four UWB transceivers each arranged proximate to a corner of the vehicle.

10. The computer-implemented method of claim 1, wherein a size of the defined driver zone is customizable via at least one of a website, an application on the mobile device, and an infotainment unit of the vehicle.

11. The computer-implemented method of claim 1, further comprising:
    determining, by the controller, whether the mobile device is an authorized mobile device by:
       detecting, via a global positioning satellite (GPS) system, whether the mobile device is within a threshold distance of the vehicle; and
       in response to the mobile device being within the threshold distance, determining, via the controller, at least one of:
          whether the human operator of the mobile device is in possession of a key fob associated with the vehicle, and
          whether the mobile device is associated with an authorized account or service of the vehicle.

12. A computer-implemented method, comprising:
    detecting, by a controller of a vehicle having a set of ultra-wideband (UWB) transceivers, a mobile device including a device UWB transceiver, wherein the controller is configured to communicate with the mobile device;
    determining, by the controller, a defined driver zone within the vehicle, the defined driver zone indicating a set of boundary positions within the vehicle relative to a driver seat within the vehicle;
    communicating, by the controller via the set of vehicle UWB transceivers, with the device UWB transceiver to determine a position of the mobile device within the vehicle;
    detecting, by the controller, that a human operator is sitting in the driver seat of the vehicle and that the human operator has started and begun driving the vehicle;
    commanding, by the controller, the mobile device to enable a driver mode whereby operation of the mobile device is limited when (i) the determined position of the mobile device is within the defined driver zone and (ii) the controller detects that the human operator is sitting in the driver seat of the vehicle and has started and begun driving the vehicle;

detecting, by the controller, a subsequent stop of the vehicle; and automatically commanding, by the controller, the mobile device to disable the driver mode in response to the controller detecting the subsequent stop of the vehicle.

13. The computer-implemented method of claim 12, wherein:
   the driver mode limits a set of functions of the mobile device;
   the set of functions includes display and receiving touch inputs; and
   the set of functions are carried via an infotainment unit of the vehicle in response to the mobile device being in the driver mode.

14. The computer-implemented method of claim 12, wherein at least one of a center position, a shape, and size of the defined driver zone is user-customizable.

15. The computer-implemented method of claim 12, wherein:
   the set of vehicle UWB transceivers includes one vehicle UWB transceiver located approximately at a center of the driver seat of the vehicle; and
   the defined driver zone has a circular shape.

16. The computer-implemented method of claim 12, wherein the set of vehicle UWB transceivers includes at least three UWB transceivers.

17. The computer-implemented method of claim 16, wherein the defined driver zone has a square or rectangular shape.

18. The computer-implemented method of claim 16, wherein the set of vehicle UWB transceivers includes three UWB transceivers arranged in a triangular configuration.

19. The computer-implemented method of claim 16, wherein the set of vehicle UWB transceivers includes four UWB transceivers arranged in a diamond configuration.

20. The computer-implemented method of claim 16, wherein the set of vehicle UWB transceivers includes four UWB transceivers arranged proximate to four corners of the vehicle.

\* \* \* \* \*